United States Patent
Carrion Schafer

(10) Patent No.: US 8,977,996 B2
(45) Date of Patent: Mar. 10, 2015

(54) METHOD, DESIGN APPARATUS, AND PROGRAM PRODUCT FOR INCREMENTAL DESIGN SPACE EXPLORATION

(75) Inventor: Benjamin Carrion Schafer, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/823,635

(22) PCT Filed: Oct. 28, 2010

(86) PCT No.: PCT/JP2010/069649
§ 371 (c)(1),
(2), (4) Date: Jun. 3, 2013

(87) PCT Pub. No.: WO2012/056591
PCT Pub. Date: May 3, 2012

(65) Prior Publication Data
US 2013/0239076 A1 Sep. 12, 2013

(51) Int. Cl.
*G06F 17/50* (2006.01)
(52) U.S. Cl.
CPC .......... *G06F 17/505* (2013.01); *G06F 2217/08* (2013.01)
USPC ........... 716/106; 716/103; 716/104; 716/107; 716/101; 716/111; 716/132; 703/13; 703/14

(58) Field of Classification Search
CPC . G06F 17/28; G06F 17/2785; G06F 17/2818; G06F 17/5022; G06F 17/271; G06F 11/3447; G06F 17/227; G06F 17/505; G06F 2217/08; G06F 11/3457; G06F 11/3452; G06F 11/3476; G06N 7/00; G06N 3/10

USPC ......... 716/103–104, 106–107, 110–111, 132; 703/13–14
See application file for complete search history.

(56) References Cited

U.S. PATENT DOCUMENTS

| 5,533,179 | A | 7/1996 | Kucukcakar et al. | |
| 7,797,329 | B2 * | 9/2010 | Lujan Moreno et al. | 707/758 |
| 8,266,571 | B2 * | 9/2012 | Chapman et al. | 716/136 |

FOREIGN PATENT DOCUMENTS

JP   2004-265224 A   9/2004

OTHER PUBLICATIONS

The international search report for PCT/JP2010/069649 mailed on May 13, 2011.

(Continued)

*Primary Examiner* — Nghia Doan
(74) *Attorney, Agent, or Firm* — Sughrue Mion, PLLC

(57) ABSTRACT

A design apparatus generates an optimal design condition by design space exploration. The apparatus including a source code parsing (301) which parses source code and generates a parse tree, a cluster generation task (302) which generates clusters based on the parse tree, each of the clusters including a group of source codes which can operate independently, a log file task (303) which generates a log file based on a structure of the cluster, and a comparison task (304) which compares a first log file of a previous cluster with a second log file of a current cluster and re-uses previous exploration result based on a comparison result, the first log file being obtained from a previous design space exploration, the second log file being generated from a current operation.

13 Claims, 8 Drawing Sheets

(56) References Cited

OTHER PUBLICATIONS

Benjamin Carrion Schafer et al: "Design Space Exploration Acceleration Through Operation Clustering", IEEE Transactions on Computer Aided Design of Integrated Circuits and Systems, IEEE Service Center, Piscataway, NJ, US vol. 29, No. 1, Jan. 1, 2010, pp. 153-157, XP011286445, ISSN: 0278-0070, DOI: DOI:10.1109/TCAD.2009. 2035579 cited in the application the whole document.

Giomi J-C Ed-Tsai Y T et al: "An incremental synthesis method for ASIC design", ASIC Conference and Exhibit, 1992., Proceedings of Fifth Nnual IEEE International Rochester, NY, USA Sep. 21-25, 1992, New York, NY, USA, IEEE, US, Sep. 21, 1992, pp. 158-161, XP010066776, DOI: DOI: 10.1109/ASIC..1992.270287 ISBN: 978-0-7803-0768-1 the whole document.

* cited by examiner

Fig. 8

```
801─ DESIGN ./001 AREA 5043 RAM 64 LATENCY 9 CP_DELAY 2.25 CYCLES_SIM 51100
       802   804
805─ #<ATTR> <serial> <type>   <operation> <attr name>    <attr value>
     ATTR    001652   array                               RAM
     ATTR    001573   loop     for         unroll_times   1
     ATTR    0        loop     for                        VOID
                      806         807  808          809

DESIGN ./002 AREA 5043 RAM 0 LATENCY 2 CP_DELAY 1.85 CYCLES_SIM 1000
     #<ATTR> <index>  <type>   <operation> <attr name>    <attr value>
     ATTR    001652   array                               reg
     ATTR    001573   loop     for         unroll_times   all
     ATTR    0        loop     for                        VOID DESIGN ./NNN AREA 15654 RAM 430 LATENCY 2 CP_DELAY 1.85 CYCLES_SIM 400
     #<ATTR> <index>  <type>   <operation> <attr name>    <attr value>
     ATTR    001652   array                               RAM
     ATTR    001573   loop     for         unroll_times   5
     ATTR    006534   loop     for                        all
```

METHOD, DESIGN APPARATUS, AND PROGRAM PRODUCT FOR INCREMENTAL DESIGN SPACE EXPLORATION

This application is a National Stage Entry of PCT/JP2010/069649 filed Oct. 28, 2010, the contents of all of which are incorporated herein by reference, in their entirety.

TECHNICAL FIELD

The invention relates to methods, apparatus, and program products related to electronic design automation (EDA) and particularly to circuit design for the incremental exploration of the design space of high level languages in high level synthesis.

BACKGROUND ART

A method and apparatus for accelerating the automatic generation of LSI circuits with the same functionality but different characteristics (e.g., area, latency, throughput, power consumption, memory usage) starting from a behavioral circuit description, also called design space exploration (DSE), is presented.

A series of unique hardware architectures with the same functionality that meet a set of constraints (e.g., area, timing, power, temperature) are automatically generated starting from an LSI circuit description at behavioral functional level.

The main objective in design space exploration is to find the most efficient circuits for a set of specified constraints.

CITATION LIST

Patent Literature

PTL 1: Japanese Unexamined Patent Application Publication No. 2004-265224

Non Patent Literature

NPL 1: Design Space Exploration Acceleration through Operation Clustering, Benjamin Carrion Schafer and Kazutoshi Wakabayashi, IEEE Transaction on Computer Aided Design (TCAD) January 2010, Vol 29, Issue 1, pp. 153-157

SUMMARY OF INVENTION

Technical Problem

The fundamental problem in design space exploration is its long running time (exponential time complexity), which makes it intractable especially for medium and larger size designs.

The main problem in design space exploration is the size of the design space. Almost an unlimited number of LSI circuits can be generated from a single behavioral functional description.

The non-patent literature 1 (Design Space Exploration Acceleration through Operation Clustering, Benjamin Carrion Schafer and Kazutoshi Wakabayashi, IEEE Transaction on Computer Aided Design (TCAD) January 2010, Vol 29, Issue 1, pp. 153-157) accelerates the design space exploration by applying a fixed set of synthesis directives to predefined constructs in the source code. This proposed method is fast, but leads to not finding many of the efficient LSI designs.

The patent literature 1 (Japanese Unexamined Patent Application Publication No. 2004-265224) further accelerates the design space exploration by building clusters of independent set of explorable operations, which are in turn explored independently in order to find the smallest and fastest design of each cluster. These designs are in turn merged to obtain the Pareto-optimal designs. The patent literature 1 accelerates the design space exploration by applying a fixed set of synthesis directives to predefined constructs in the source code. This proposed method is fast, but leads to not finding many of the efficient LSI designs.

Solution to Problem

The method, system, and program product described herein provide a tool for incremental design space exploration. The goal of this invention is to provide a method for incremental design space exploration to avoid having to re-run the complete exploration if minor changes in the original source code are performed and hence accelerate the search space exploration. Usually the design space exploration needs to be completely restarted when any change in the source code is performed. The present invention avoids having to re-run a complete exploration to obtain the most efficient designs (also called Pareto-optimal designs, non-dominated or dominating designs), when localized changes in the source code are performed, which leads to a faster design space exploration by re-using the results of the previous design space exploration.

An exemplary object of the present invention is to provide a method and apparatus to perform incremental design space exploration (DSE) for behavioral descriptions targeted for hardware designs.

The objective of design space exploration is to automatically generate a series of unique hardware architectures given a set of constraints like area, throughput and power from an untimed high level language description e.g., ANSI C. The main objective in design space exploration is to resolve minimizing conflicting objectives by finding the optimal designs for different objective functions. This objective involves finding all the designs at the Pareto frontier as shown in FIG. 1, where each point on the efficient frontier is a Pareto optimal point. The architectural tradeoffs can easily be explored within this set rather than considering the entire design space, which would be impractical and irrelevant to the designer.

In more detail, an exemplary object of the present invention is to provide the method, system, and program product to perform incremental design space exploration of LSI design systems for the case when minor changes in the original behavioral description are performed, accelerating the design space exploration further.

Briefly described, the present invention includes a method to enable incremental automated design space exploration of LSI design systems specified in a behavioral language. The design space exploration involves the synthesis of the behavioral description using a high level synthesis tool (HLS). The synthesis result can be controlled by setting global synthesis options and/or particular synthesis directives annotated directly at the circuit description. These global synthesis options and local synthesis directives lead to the generation of different LSI designs.

The global synthesis options affect the entire LSI description, while the local synthesis directives affect only parts of the design and are specified directly at concrete operations directly in the source code. Some of these operations include loops, functions and arrays. For example, a loop can be unrolled completely, partially or not unrolled. Arrays can be mapped to registers, hardwired logic or memory and functions can be synthesized as a single hardware block or multiple blocks.

FIG. 1 shows an example of the result of applying different global and local synthesis directives to the behavioral description of an LSI design. The figure indicates that designs with larger area tend to have a higher performance, while smaller designs tend to have a lower performance. The goal of the design space exploration' goal is to find the most efficient designs for each area/performance combination. These designs are also commonly known as Pareto-optimal designs, which lie on the efficient frontier as shown in FIG. 1.

An exemplary aspect of the present invention is a method for accelerating the design space search for LSI designs starting from a behavioral description when minor changes in the original behavioral description are performed.

According to an exemplary aspect of the present invention, a design method for generating an optimal design condition by design space exploration, the method including, parsing source code to generate a parse tree, generating clusters based on the parse tree, each of the clusters including a group of source codes which can operate independently, generating a log file based on a structure of the cluster, and comparing a first log file of a previous cluster with a second log file of a current cluster to re-use previous exploration result based on a comparison result, the first log file being obtained from a previous design space exploration, the second log file being generated from a current operation.

According to another exemplary aspect of the present invention, a program product for making a computer execute an operation to generate an optimal design condition by design space exploration, the program product including, parsing source code to generate a parse tree, generating clusters based on the parse tree, each of the clusters including a group of source codes which can operate independently, generating a log file based on a structure of the cluster, and comparing a first log file of a previous cluster with a second log file of a current cluster to re-use previous exploration result based on a comparison result, the first log file being obtained from a previous design space exploration, the second log file being generated from a current operation.

According to another exemplary aspect of the present invention, a design apparatus for generating an optimal design condition by design space exploration, the apparatus including, a parse unit which parses source code and generates a parse tree, a cluster generator which generates clusters based on the parse tree, each of the clusters including a group of source codes which can operate independently, a log file generator which generates a log file based on a structure of the cluster, and a comparison execution unit which compares a first log file of a previous cluster with a second log file of a current cluster and re-uses previous exploration result based on a comparison result, the first log file being obtained from a previous design space exploration, the second log file being generated from a current operation.

Implementations of the invention include providing any of the various aspects of the invention. Accordingly, implementations of the invention include implementations as a service method in which any of the apparatus and program product aspects, alone or in combination, are deployed at user site to address the above-described challenges.

The above-described summary of the invention does not list all essential features of the present invention and sub-combinations of these features are also covered by the present invention.

Advantageous Effects of Invention

According to the Invention, one or more of the above-mentioned problems is/are ameliorated or overcome.

BRIEF DESCRIPTION OF DRAWINGS

FIG. 8 illustrates an example of the log file generated while the exploration is executed storing the information necessary to allow the incremental exploration if the exploration is re-run in accordance with one exemplary embodiment of the invention.

DESCRIPTION OF EMBODIMENTS

While the present invention will be described more fully hereinafter with reference to the accompanying drawings, in which a preferred exemplary embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching, disclosure directed to persons of skill in the appropriate arts, and not as limiting upon the present invention. Furthermore, not all of the combinations of features described with respect to any exemplary embodiment are essential for the solution according to the present invention.

As will be described below, aspects of one exemplary embodiment pertain to specific method steps implementable on computer systems. On one exemplary embodiment, the invention may be implemented as a computer program-product for use with a computer system. The program defining the functions of at least one exemplary embodiment can be provided to a computer via a variety of computer-readable media (i.e., signal-beading medium), which include but are not limited to, (i) information permanently stored on non-writable storage media (e.g., read-only memory devices within a computer such as read only CD-ROM disks readable by a CD-ROM or DVD drive; (ii) alterable information stored on a writable storage media (e.g., floppy disks within diskette driver or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative exemplary embodiments of the invention. It may also be noted that portions of the product program may be developed and implemented independently, but when combined together are exemplary embodiments of the invention.

Figure 7:
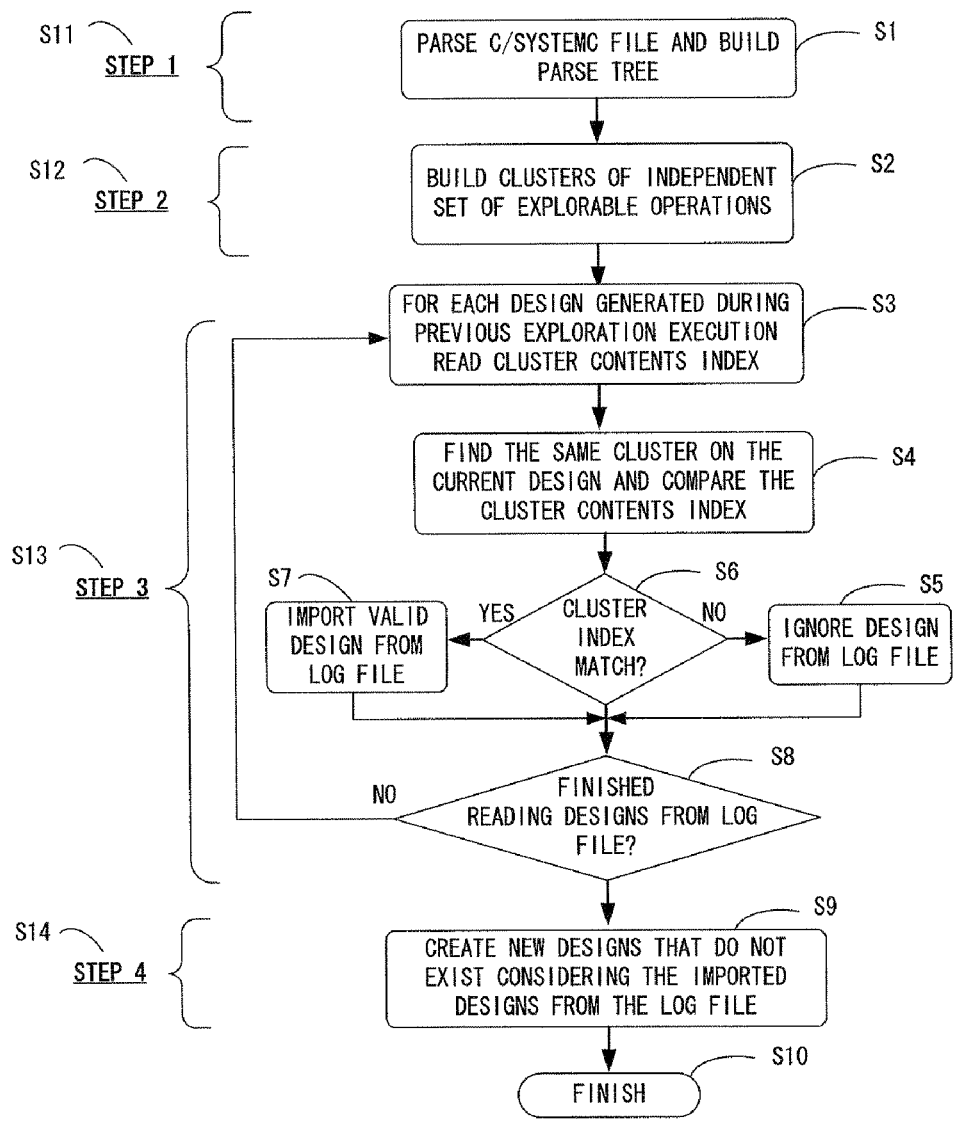
FIG. 7 illustrates a data flow graph of the entire exploration flow when changes in the original behavioral description are performed in accordance with one exemplary embodiment of the invention.

An exemplary aspect of the present invention is a method for performing incremental design space exploration by recording the designs generating during the exploration so that this information can be retrieved during the next exploration execution to avoid re-generating the same designs and identifying if the source code between different executions have changed so that only those parts of the source code which are affected by the changes are explored. The method consists of the following steps as shown in FIG. 7.

Figure 4:
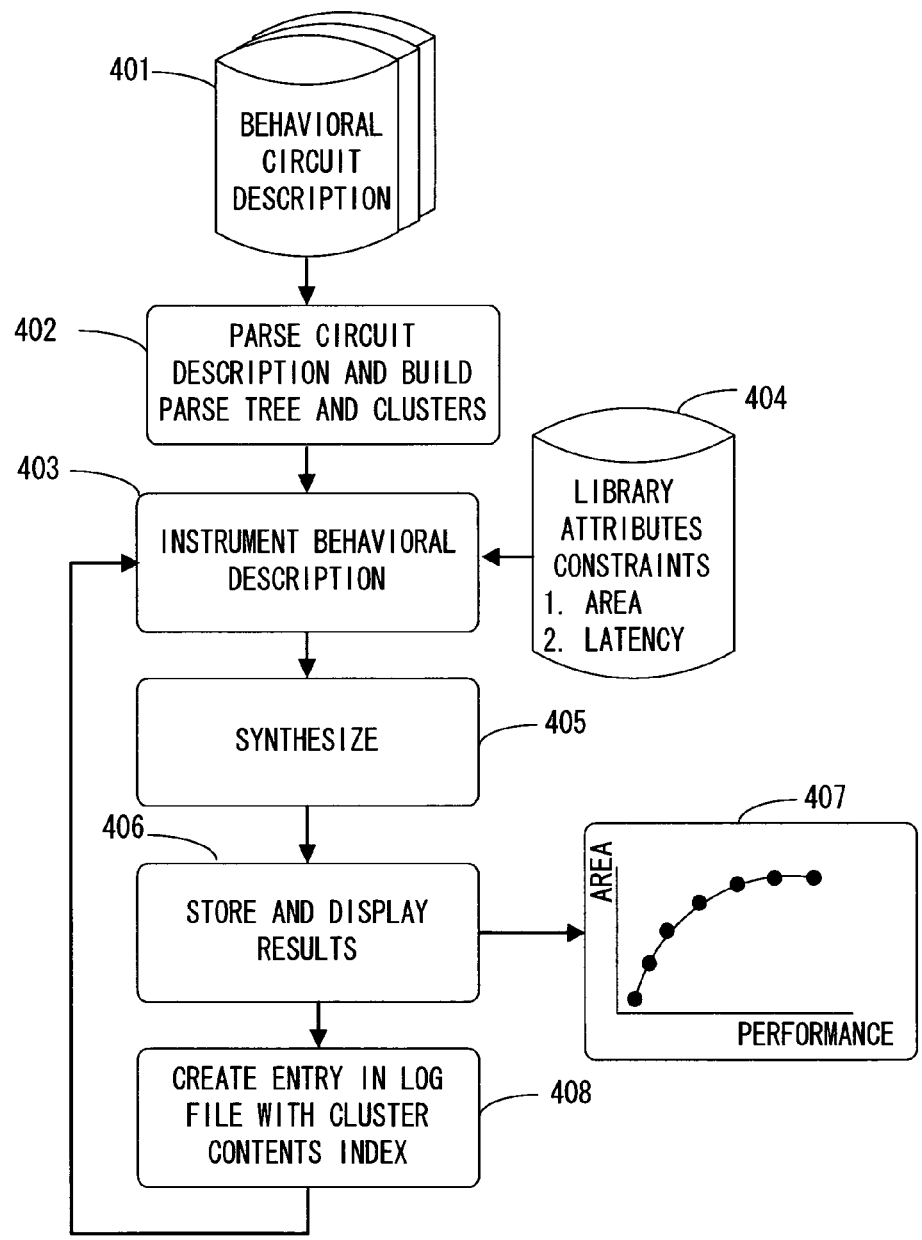
FIG. 4 is a diagram showing a flow chart of the LSI design exploration method enabled for incremental exploration according to an exemplary embodiment of the present invention.

STEP 1 S11: Parse the behavioral LSI description and build a dependency parse tree for all operations that can be explored (operations to which a synthesis directive can be applied). FIG. 4 shows an example of the parse tree generation, where a tree with the dependencies of all the explorable operations specified in an internal or external library is created ([P001] describes in detail the creation of the parse tree).

Figure 5:
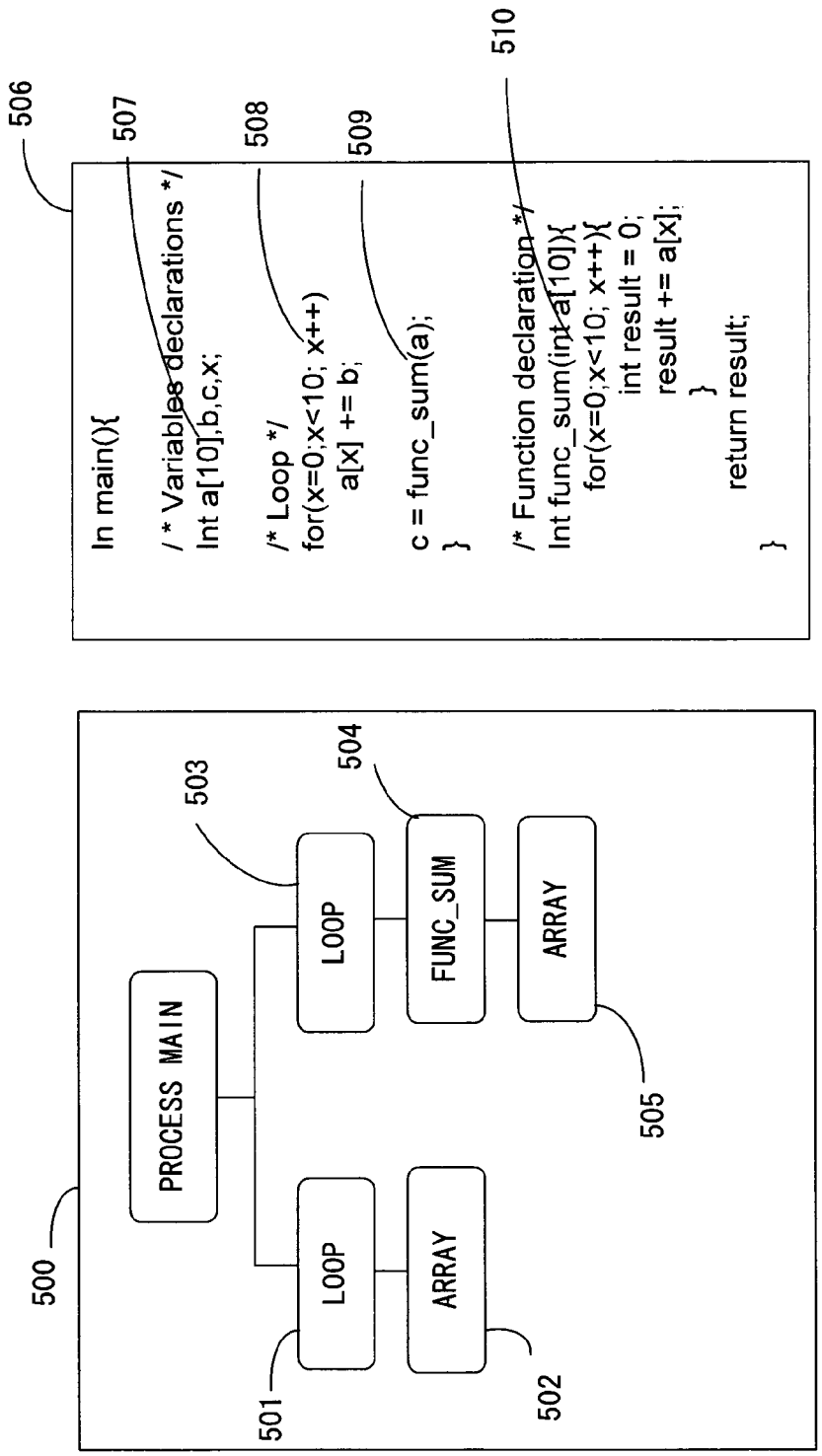
FIG. 5 illustrates an example of a dependency parse tree generation from a given untimed behavioral LSI design description in accordance with one exemplary embodiment of the invention.

STEP 2 S12: Independent clusters are built for each independent parse tree node and the cluster contents index (CCI) for each cluster by parsing the source code in each cluster generating a unique alphanumeric combination based on the source code operations of each cluster. FIG. 5 shows an example of cluster generation and FIG. 8 shows CCI. The CCI is a serial number for each cluster. The CCI summarizes with a single number the contents of a cluster. It contains the number of operations, the type, the number of iterations etc. This allows the method to analyze if the source code in a particular cluster has changed between two explorations.

That is, after parsing a behavioral LSI description, the system generates unique identifiers for each part of source codes explored independently. The method analyzes the source code (parses the source code) looking for sets of operations e.g., nested loops that can be explored independently. Exploring independently means that synthesis directives will only be applied to these operations to obtain N different designs. The result of each synthesis is a unique VLSI design with different area and latency. The method analyzes each independent cluster and creates a unique serial number for each of them based on their contents (which operations, how many, iteration count etc. . . . ).

STEP 3 S13: Read the log file generated during the previous exploration execution (in case this is not the first time the design space exploration is performed). Read the alphanumeric cluster contents index (CCI) for each design and compare it against the CCI index of the current exploration clusters. If they do not match ignore the designs from the log file as this indicates that the source code has been modified between exploration executions. If they match load the design into the program and re-generate the internal data structure.

That is, the system identifies which parts of the source code have been modified between different exploration runs. Whenever an exploration is restarted the method re-analyzes the original source code and re-generates the unique serial number for each independent cluster. It then reads the log file generated in the previous execution and checks if they match or not. If they match it means that the source code for this portion of the program has not been modified between the two explorations executions. If they do not match it means that the user has manually modified the source code between these two exploration runs and the method cannot use the designs generated by the previous exploration for this independent cluster and the designs are discarded. This check is performed for all independent clusters.

Then, the system explores only parts of the designs which have been affected by the manual changes in the source code. The explorer analyzes the original source code and builds a list of independent operations (e.g., nested loops or function calls). It then computes the serial number for each cluster by analyzing the contents of each cluster, recording e.g., the number of operations in each cluster, the type of operations and iterations numbers. It can then identify if any changes between two explorations have happened by comparing if this serial number has changed between two exploration executions.

STEP 4 S14: Perform the design space exploration for the combinations of synthesis directives that have not been generated in the previous exploration or for those parts of the source code where changes in the source code between exploration executions have been detected by comparing the cluster contents index.

The incremental exploration is possible because of the grouping of independent operations in separate clusters in STEP 2 S12, which allows the exploration of only parts of the source code, which in turns allows to detect changes in the source code and re-explore only those clusters which are affected by the source code changes.

Turning now descriptively to the drawings, in which similar reference characters denote similar elements throughout the several views, the attached figures illustrate how incremental search of Pareto optimal designs starting from an untimed high level language description for high level synthesis is performed.

A given behavioral description of an LSI design can be manually instrumented with synthesis directives to e.g., synthesize arrays as register, memory of fixed logic.

These synthesis directives guide the high level synthesis tool in the synthesis process, converting the behavioral LSI description into a detailed LSI design (e.g., RTL language). The method presented in this invention automatically inserts different synthesis directives into the behavioral LSI description resulting in different circuits with different characteristics, keeping only the most efficient designs.

Figure 1:
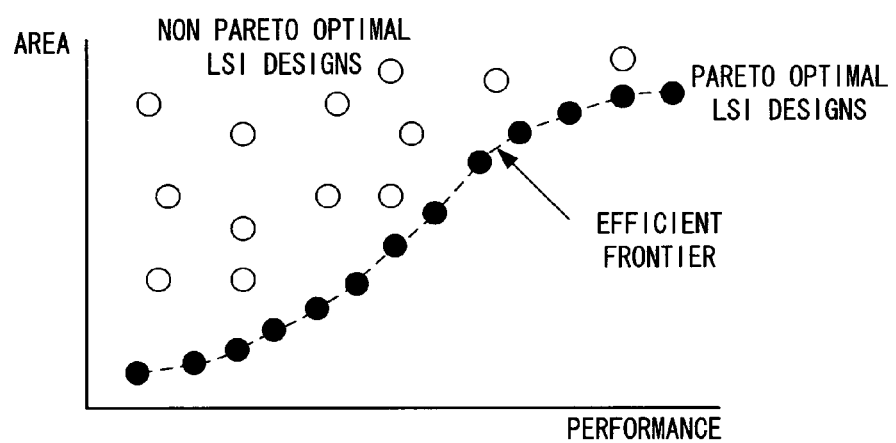
FIG. 1 illustrates the design space exploration result showing the efficient LSI design frontier (also called Pareto front) which contains all the Pareto optimal LSI designs in accordance with one exemplary embodiment of the invention.

Referring now more particularly to the accompanying drawings, in which like numerals indicate like elements or steps throughout the several views, FIG. 1 shows the general objective of the design space exploration. Only Pareto optimal LSI designs need to be found in order to explore the architectural tradeoffs easily within this set rather than considering the entire design space, which would be impractical and irrelevant to the designer. Obtaining only these LSI designs using a brute force method or generating them manually is very time consuming and not practical.

Figure 2:
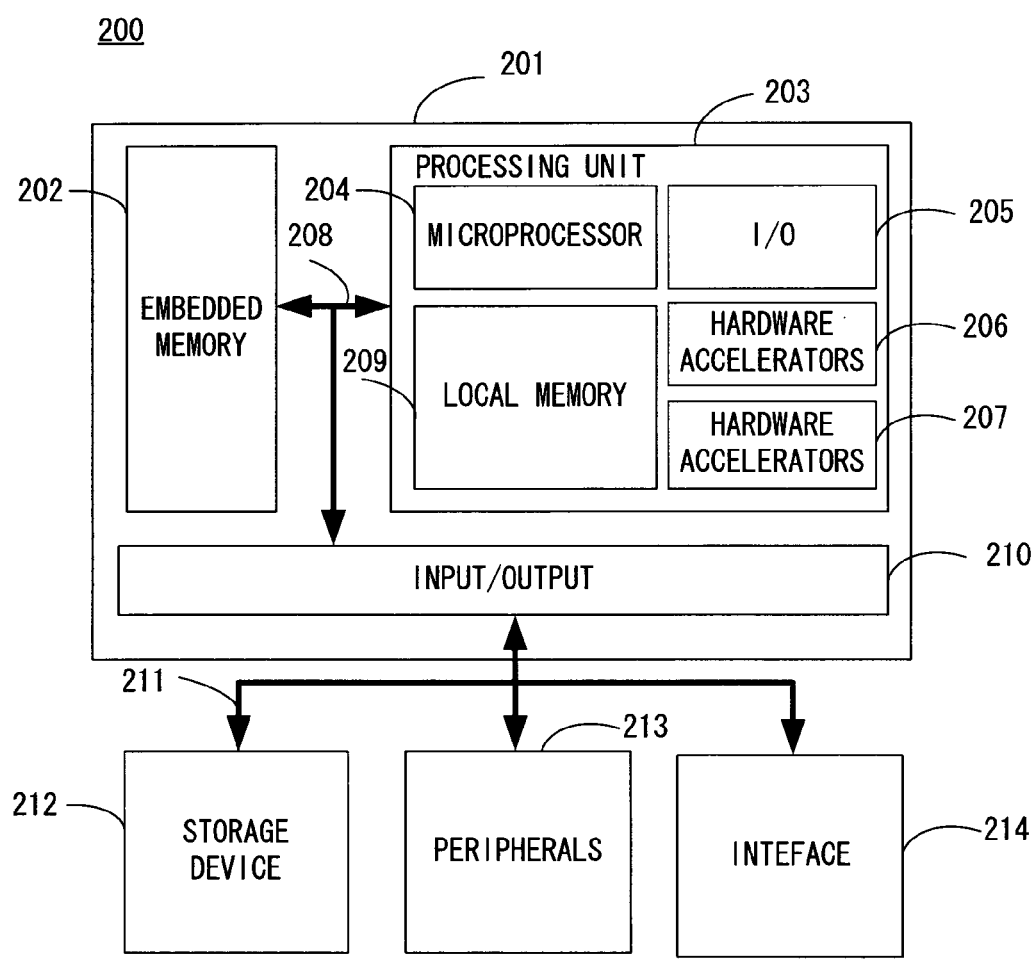
FIG. 2 shows a functional block diagram of an information processing apparatus 200.

FIG. 2 shows a functional block diagram of an information processing apparatus 200 which is an example of a design apparatus of the present invention. The information processing apparatus has a complex processing unit 201, which is a subsystem integrated on the same LSI design, composed of a processing unit 203, embedded memory 202, an input and output port 210 including a communication interface. All units in the processing apparatus are interconnected 208. The processing apparatus also consists of a storage device 212, different types of peripherals and interfaces 214 all interconnected together by a bus 211.

The processing unit includes a microprocessor 204, a local memory 209, an input and output port 205 and two dedicated hardware acceleration blocks 206, 207, which can perform a variety of functions more efficiently than a generic processor. The design of these dedicated acceleration blocks 206, 207 are very time consuming and the present invention allows the design of these units much faster than traditional methods creating automatically a set of efficient LSI designs that meet the given area, performance, power and temperature constraints.

Figure 3:
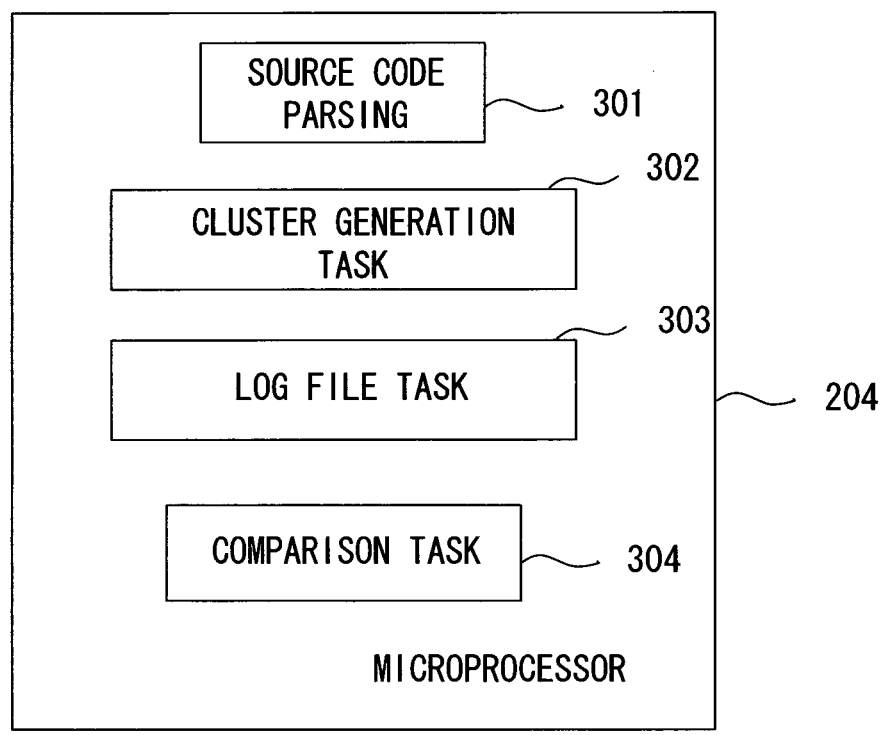
FIG. 3 is a block diagram of a design apparatus of the exemplary embodiment of the present invention.

FIG. 3 is a block diagram of the tasks that the microprocessor 204 of the present exemplary embodiment has to execute. As shown in FIG. 3, the microprocessor 204 tasks' include a source code parsing (parse unit) 301, a cluster generation task (cluster generator) 302 a log file task (log file generator) 303 and a comparison task (comparison execution unit) 304 apart from the design space exploration. The source code parsing 301 parses the source code and generates a parse tree. The cluster generation task 302 generates clusters based on the parse tree. Each cluster includes a group includes a group of source code operations that can operate independently. The log file task 303 generates a log file based on the cluster structures. Finally the comparison task 304 compares the first log file's cluster information obtained during a previous exploration with the cluster information of the current exploration and re-uses the previous exploration results based on the comparison results.

FIG. 4 shows a flow chart of an LSI design exploration method according to an exemplary embodiment of the present invention. In contrast to prior art design flow, which involves manual modification of the LSI description or a very time consuming automated process, the present invention accelerates the design space exploration. Starting from a behavioral LSI functionality description 401, the description is parsed and a parse tree and independent clusters with only the operations that can be explored are created 402. The behavioral LSI functionality description 401 is the behavioral description, the C-program that is the input to the high level synthesis program that generates RTL (hardware). High level synthesis is the process of creating a VLSI circuit represented in a Hardware Description Language, given a software program. The explorer only inserts synthesis attributes in function declarations, loops and arrays. Note that, this is only the case here as an example, but that any operation which can be synthesized to different types of hardware circuits could be considered. Independent clusters on the other hand are groups of these explorable operations that are not interdependent.

The behavioral description is automatically instrumented inserting synthesis directives directly at the source code for each cluster 403. In instrument behavioral description 403, synthesis attributes are inserted in the source code in order to obtain a new VLSI design. The library 404 is needed by the high level synthesis tool in order to create optimized hardware designs holding the area and delay information of each basic operation (addition, multiplication etc. . . . ). This information is stored in the libraries that need to be provided by the user. The high level synthesis process consists of parsing the source code, scheduling it (timing it) and then assigning hardware operators to each operation in the source code. In order to obtain an optimized design it needs to know the delay and area of each operation in order to create a small and fast circuit. These are the basic steps of high level synthesis, but are not anything novel and has been studied in the past extensively.

The instrumented LSI description is synthesized (405) using high level synthesis 405 and the results of the synthesis are read and stored 406 in order to continue the exploration until all the most efficient designs are created. Synthesis 405 is the process of converting the input source code (behavioral description) into a hardware design. Once the explorer inserts a new set of attributes in the source code, it requires the high level synthesis tool in order to create a new VLSI Design. The HLS tool also reports the area, delay, critical path etc. of the resultant circuit. This result is read by the explorer and displayed graphically in a graphical environment. Many designs are created by the explorer, but only the most efficient ones, also called Pareto-optimal, are kept.

During the iterations the created designs can be displayed in a trade-off window 407 and a log file with the synthesis result and contents of each cluster represented by an alpha-numerical string 408 also shown in FIG. 8. The trade-off window 407 is a graphical user interface window that displays in a graph all the designs explored. It is called trade-off window 407, because the user can easily understand that smaller designs are slower and that faster designs are larger. The user can easily identify the different area vs. speed (latency) trade-offs. While the exploration is taken place the result of the synthesis and the attributes used for the current synthesis are recorded in the log file, so that these results can be used in a later exploration (incremental exploration).

In step 408, in particular it stores a summary of the synthesis result (area, memory, latency, critical path, etc. . . . ) and the attributes created by the explorer for this design including the cluster contents index (806).

The design apparatus generates a log file where all the necessary information to recover a design generated during exploration is recorded including the results of the high level synthesis, the attributes applied to the explorable operations and the cluster contents index. The results of the high level synthesis are the main characteristics of the VLSI design generated i.e. the area, the latency, critical path delay and power. In order to create different VLSI designs from the same source code synthesis attributes are inserted into the source code. This is what the explorer does in order to obtain designs with different characteristics. For example, an array given in the original source code can be synthesized to registers in hardware or to memory. As described above, the cluster contents index (CCI) is the unique serial number created by analyzing each individual cluster's contents. A cluster contents index, which represents in a single unique alpha numerical value the contents of the piece of the behavioral description (sub-system) being explored. The apparatus generates the log file, while the exploration takes place. Each time a new designs is generated it records it in the log file.

The exploration executes in incremental mode, where the information recorded in the log file is read and the data is loaded into the program. Incremental mode means being able to re-run an exploration re-using the results of a previous exploration execution. Normally a new exploration requires execution of a completely new exploration from scratch. With this method some results of the previous exploration can be re-used so that the new exploration will run much faster, because it does not have to re-generate some of the designs created in the previous exploration. Data is all the information needed by the explorer to obtain the best possible designs. This includes the area, delay, latency, power of the designs and the cluster contents index as well as the attributes used that lead to this result.

The data structure based on the information specified in the log file for each valid design created during the previous exploration is re-generated. The re-generation of the data structure means reading the data stored in a log file and converting it into an internal data structure that can be used for the exploration. Valid design means designs that have been successfully been generated. Very often the combination of attributes used during the exploration leads to errors in the synthesis. They are also recorded in the log file, but as faulty designs. In our case we are only interested in the designs that have been correctly synthesized.

Then, the designs from a previous exploration are checked before a new designs are generated in order to avoid applying the same synthesis directives to a new design being generated. The explorer analyzes the attributes created for all the previously generated designs (previous exploration), before it creates a new designs for the current exploration in order to avoid re-generating the exact same design that was created in the previous exploration (i.e., a designs that has the exact same attributes). The method avoids applying the same synthesis directives by comparing the synthesis directives from the previous exploration with the synthesis directives created in the current exploration.

The system finishes the exploration of one cluster when it exhausts all the possible synthesis attributes combinations. It then proceeds with the next cluster.

FIG. 5 illustrates a dependency parse tree 500 generated during the first step of the proposed method 402 from an original behavioral LSI description 506. The dependency parse tree is the main data structure of the method as it allows extracting independent group of operations of the description in order to study the effect of synthesis attributes on each of these groups. Each node in the tree corresponds to an operation in the behavioral description 506, which can be explored. In this example array 507 is included in the parse tree each time it is accessed at 502 and 505, loop 508 and loop 510 are included in the parse tree in 501 and 503 and the function 509 is included in 504.

Figure 6:
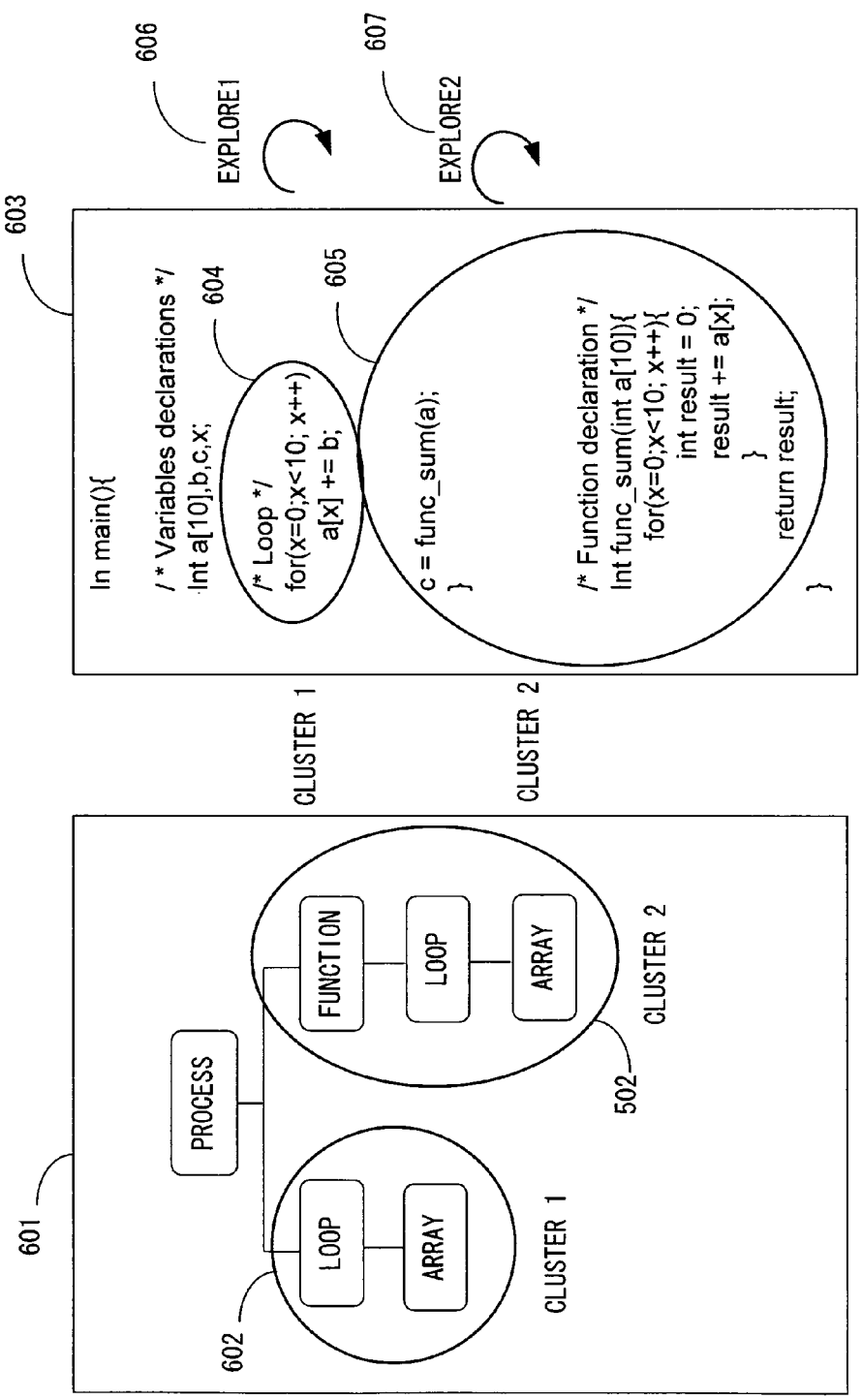
FIG. 6 illustrates the construction of independent clusters that will be explored separately in order to analyze the impact on the synthesis directives on the synthesized LSI circuit in accordance with one exemplary embodiment of the invention.

FIG. 6 illustrates the creation of clusters 402 of each independent subset of explorable operations for a parse tree 601 generated from a parse behavioral LSI description 603. Two independent clusters are created in this case, where cluster 1 (602) includes a loop and an array 604 and cluster 2 (602) includes a function, loop and the same array 605. The source code in each cluster is analyzed and a unique alphanumerical string is created based on its contents. Each cluster is explored separately 606, 607.

FIG. 7 illustrates a block diagram of the proposed invention identifying the four main steps in the method. The method consists of four main steps. The first step parses the behavioral LSI description in step S1, which corresponds to STEP 1 (S11). Step S1 corresponds to step 402 of FIG. 4. Then the parse tree and the clusters are built in step S2, corresponding to STEP 2 (S12). Step S2 also corresponds to step 402 of FIG. 4. The third step STEP 3 (S13) imports the results of a previous design space exploration by reading the information stored in a log file created during the previous exploration in step S3. It then compares the cluster contents index (CCI) of the design being read from the log file with the CCI from one of the clusters in the current parse tree To judge whether they match in step S4. If a match occurs in step S6 the design is loaded into the program in step S7. If it does not match the design is discarded in step S5. This process is repeated until all designs from the log file are analyzed S8. The fourth step (STEP 4) S14 generates all possible synthesis attributes for each cluster in step S3 and synthesizes the instrumented behavioral description in step S4 which has not been generated during the previous exploration. Step 9 indicates that only designs that have not been generated in the previous exploration are created. All designs from the clusters, where the source code remains the same can be re-used, but if the source code has been edited or if the previous exploration was interrupted prematurely new designs need to be created for that particular cluster(s).

FIG. 8 illustrates an example of the log file generated during the exploration. A first line 801 records a summary of the result of the high level synthesis so that the explorer understands the impact of the attributes used during this exploration (809) on the different design parameters in order to be able to identify only the optimal designs.

The terms "attributes" and "synthesis directives" are used interchangeably in this specification. The attributes are synthesis directives that are specified at the source code. These directives are specified at source code constructs that can be synthesized to hardware in various ways in order to indicate the synthesis tool how exactly this construct e.g., an array can be synthesized as registers or memory.

This line also specifies the location of the design 802 and the main results of the synthesis e.g., area, latency, critical path 804. The log file also records the combination of synthesis directives used for each design specifying the explorable operation 807, the variable name or operation name where the directive is applied 808 and the attribute 809. One central piece of information is the cluster contents index 806. The explorable operations are constructs in the source code that can be synthesized in multiple ways to different hardware circuits. The way to control the hardware generated for these constructs is normally through local synthesis directives annotated directly at the source code or through global synthesis directives that affect all the constructs of the same type.

This number specifies the cluster to which the operation belongs (first three digits), while the rest of the number summarizes the contents of the explorable operation. This number can be obtained in multiple ways, e.g., considering the source codes ASCII values, internal data structure position or a combination of these methods, but not limited to them. The important aspect is that whenever the data structure is re-generated in a later new exploration run the same CCI index generation method should lead to the same alphanumeric number if the source code content has not changed.

Explorable operation contents index is further required in addition to the cluster content index, because the explorable operation contents index represents the contents of each explorable operation in each cluster. The cluster contents index is a numerical representation of the contents of an explorable operation (i.e. a source code construct that has different hardware implementations that can be controlled by the synthesizer). This index is formed by analyzing the contents of the operation, its parameters, loop iterations, initialization of variables, number and type of operations, but not limited to them.

Meaningless information for the exploration e.g., tabs, spaces and comments should be ignored when generating the CCI. The method should be able to re-generate the internal data structure given the information specified in the log file, importing on necessary information so that the explorer does not generate an identical combination of synthesis options and directives.

Although the foregoing invention has been described in some detail for purposes of clarity of understanding, it will be apparent that certain changes and modifications may be practiced within the scope of the appended claims. Accordingly, the present exemplary embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The present invention is presented in the context of LSI circuit design example, and the method of the present invention is also applicable to many other types of design problems including for example design problems relating to digital circuits, scheduling, chemical processing, control systems, neuronal networks, verification and validation methods, regression modeling, unknown systems, communications networks, optical circuits, sensors and flow network design problems such as road systems, waterways and other large scale physical networks, optics, mechanical components and opto-electrical components.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

For example, in the above exemplary embodiment, the data receiving device is explained as hardware. However, an arbitrary processing can be achieved by executing a program by CPU (Central Processing Unit). The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the exemplary embodiments disclosed above can be described as, but not limited to, the following supplementary notes:

(Supplementary Note 1) A method for performing incremental exploration of LSI circuits given a behavioral circuit description, comprising method operation of:

parsing a behavioral LSI description generating unique identifiers for each part of source codes explored independently;

recording a main information of designs being explored so that this information can be retrieved at later explorations;

identifying which parts of the source code have been modified between different exploration runs; and exploring only parts of the designs which have been affected by manual changes in the source code.

(Supplementary Note 2) The method according to Supplementary Note 1, wherein the method operation includes the generation of a log file where all the necessary information to recover a design generated during an exploration is recorded including the results of a high level synthesis, the attributes applied to the explorable operations, and a cluster contents index.

(Supplementary Note 3) The method according to Supplementary Note 1, wherein the method operation includes a cluster contents index, which is represented in a single unique alpha numerical value, and the contents of a piece of a behavioral description being explored.

(Supplementary Note 4) The method according to Supplementary Note 1, wherein the method operation includes:

an execution of an exploration in an incremental mode, where the information recorded in the log file is read and the data is loaded into the program; and re-generation of the data structure based on the information specified in the log file for each valid design created during a previous exploration.

(Supplementary Note 5) The method according to Supplementary Note 1, wherein the method operation includes:

checking at the designs from a previous exploration before a new design is generated in order to avoid applying the same synthesis directives to a new design being generated.

(Supplementary Note 6) A design method for generating an optimal design condition by design space exploration, the method comprising:

parsing source code to generate a parse tree;

generating clusters based on the parse tree, each of the clusters including a group of source codes which can operate independently;

generating a log file based on a structure of the cluster; and comparing a first log file of a previous cluster with a second log file of a current cluster to re-use previous exploration result based on a comparison result, the first log file being obtained from a previous design space exploration, the second log file being generated from a current operation.

(Supplementary Note 7) The design method according to Supplementary Note 6, wherein the cluster is a set of inter-dependent source code constructs, whose logic implementation can be controlled through synthesis directives.

(Supplementary Note 8) The design method according to Supplementary Note 6 or 7, wherein the log file includes a cluster contents index corresponding to each attribute included in the cluster.

(Supplementary Note 9) The design method according to Supplementary Note 8, wherein the cluster contents index is a serial number.

(Supplementary Note 10) The design method according to any one of Supplementary Notes 6 to 9, wherein the log file includes high level synthesis, attributes applied to explorable operations, and a cluster contents index which is a serial number.

(Supplementary Note 11) The design method according to any one of Supplementary Notes 6 to 10, comprising referring to a data base storing log file obtained from a previous design space exploration, and re-using a previous design exploration if there is a cluster having the same structure to the current cluster in the data base.

(Supplementary Note 12) The design method according to any one of Supplementary Notes 6 to 11, comprising referring to a data base storing log file obtained from a previous design space exploration, and performing the design space exploration of the current cluster if there is no cluster having the same structure to the current cluster in the data base.

(Supplementary Note 13) A program product for making a computer execute an operation to generate an optimal design condition by design space exploration, the program product comprising:

parsing source code to generate a parse tree;

generating clusters based on the parse tree, each of the clusters including a group of source codes which can operate independently;

generating a log file based on a structure of the cluster; and comparing a first log file of a previous cluster with a second log file of a current cluster to re-use previous exploration result based on a comparison result, the first log file being obtained from a previous design space exploration, the second log file being generated from a current operation.

(Supplementary Note 14) The program product according to Supplementary Note 13, wherein the cluster is a set of interdependent source code constructs, whose logic implementation can be controlled through synthesis directives.

(Supplementary Note 15) The program product according to Supplementary Note 13 or 14, wherein the log file includes a cluster contents index corresponding to each attribute included in the cluster.

(Supplementary Note 16) The program product according to Supplementary Note 15, wherein the cluster contents index is a serial number.

(Supplementary Note 17) The program product according to any one of Supplementary Notes 13 to 15, wherein the log file includes high level synthesis, attributes applied to explorable operations, and a cluster contents index which is a serial number.

(Supplementary Note 18) The program product according to any one of Supplementary Notes 13 to 17, comprising referring to a data base storing log file obtained from a previous design space exploration, and re-using a previous design exploration if there is a cluster having the same structure to the current cluster in the data base.

(Supplementary Note 19) The program product according to any one of Supplementary Notes 13 to 18, comprising referring to a data base storing log file obtained from a previous design space exploration, and performing the design space exploration of the current cluster if there is no cluster having the same structure to the current cluster in the data base.

(Supplementary Note 20) A design apparatus for generating an optimal design condition by design space exploration, the apparatus comprising:

a parse unit which parses source code and generates a parse tree;

a cluster generator which generates clusters based on the parse tree, each of the clusters including a group of source codes which can operate independently;

a log file generator which generates a log file based on a structure of the cluster; and a comparison execution unit which compares a first log file of a previous cluster with a second log file of a current cluster and re-uses previous exploration result based on a comparison result, the first log file being obtained from a previous design space exploration, the second log file being generated from a current operation.

INCORPORATION BY REFERENCE

The disclosure of International Application No. PCT/JP2010/056792, filed on Apr. 9, 2010 including the specification, drawings and abstract is incorporated herein by reference in its entirety.

REFERENCE SIGNS LIST 201 complex processing unit
202 embedded memory
203 processing unit
204 microprocessor
205 I/O
206, 207 hardware accelerators
210 input/output
211 bus
212 storage device
213 peripherals
214 interface
301 source code parsing
302 cluster generation task
303 log file task
304 comparison task

What is claimed is:

1. A design method for an information processing apparatus for generating optimal LSI designs by automatic design space exploration, the method comprising:

parsing, by the information processing apparatus, source code which describes a behavioral LSI to generate a parse tree;

generating clusters based on the parse tree, each of the clusters including a group of source codes which can operate independently;

executing a design space exploration of the clusters and generating a log file based on a structure and contents of the cluster;

comparing a first log file of a previous cluster with a second log file of a current cluster, the first log file being obtained from a previous design space exploration, the second log file being generated from a current operation, and re-using a previous design space exploration result if the previous cluster has a same structure as that of the current cluster.

2. The design method according to claim 1, wherein the cluster is a set of interdependent source code constructs, whose logic implementation can be controlled through synthesis directives.

3. The design method according to claim 1, wherein the log file includes a cluster contents index corresponding to the structure and operations in this cluster.

4. The design method according to claim 3, wherein the cluster contents index is a serial number.

5. The design method according to claim 1, wherein the log file includes high level synthesis, attributes applied to explorable operations, and a unique cluster contents index which is a serial number.

6. The design method according to claim 1, comprising referring to a data base storing log file obtained from a previous design space exploration, and performing the design space exploration of the current cluster if there is no cluster having the same structure to the current cluster in the data base.

7. A program product for making a computer execute an operation to generate optimal LSI designs by automatic design space exploration, the program product comprising:

parsing, by the computer, source code which describes a behavioral LSI to generate a parse tree;

generating clusters based on the parse tree, each of the clusters including a group of source codes which can operate independently;

executing a design space exploration of the clusters and generating a log file based on a structure of the cluster;

comparing a first log file of a previous cluster with a second log file of a current cluster, the first log file being obtained from a previous design space exploration, the second log file being generated from a current operation; and re-using a previous design space exploration result if the previous cluster has a same structure as that of the current cluster.

8. The program product according to claim 7, wherein the cluster is a set of interdependent source code constructs, whose logic implementation can be controlled through synthesis directives.

9. The program product according to claim 7, wherein the log file includes a cluster contents index corresponding to each attribute included in the cluster.

10. The program product according to claim 9, wherein the cluster contents index is a serial number.

11. The program product according to any one of claim 7, wherein the log file includes high level synthesis, attributes applied to explorable operations, and a cluster contents index which is a serial number.

12. The program product according to any one of claim 7, comprising referring to a data base storing log file obtained from a previous design space exploration, and performing the design space exploration of the current cluster if there is no cluster having the same structure to the current cluster in the data base.

13. A design apparatus for generating optimal LSI designs by automatic design space exploration, the apparatus comprising:
- a parse unit which parses source code which describes a behavioral LSI and generates a parse tree;
- a cluster generator which generates clusters based on the parse tree, each of the clusters including a group of source codes which can operate independently;
- a log file generator which executes a design space exploration of the cluster and generates a log file based on a structure of the cluster; and
- a comparison execution unit which compares a first log file of a previous cluster with a second log file of a current cluster, the first log file being obtained from a previous design space exploration, the second log file being generated from a current operation, and re-uses a previous design space exploration result if the previous cluster has a same structure as that of the current cluster.

* * * * *